(12) United States Patent
Morgan

(10) Patent No.: US 8,197,570 B2
(45) Date of Patent: Jun. 12, 2012

(54) CANISTER AIR FILTER AND METHOD FOR FABRICATING THE SAME

(75) Inventor: Lee Pendleton Morgan, Jonesboro, AR (US)

(73) Assignee: Camfil Farr, Inc., Jonesboro, AR (US)

(*) Notice: Subject to any disclaimer, the term of this patent is extended or adjusted under 35 U.S.C. 154(b) by 586 days.

(21) Appl. No.: 12/410,436

(22) Filed: Mar. 24, 2009

(65) Prior Publication Data

US 2010/0242423 A1 Sep. 30, 2010

(51) Int. Cl.
*B01D 39/00* (2006.01)

(52) U.S. Cl. ............... 55/498; 55/483; 55/510; 55/302; 55/385.2; 55/502; 55/497; 55/506; 55/505; 55/521; 55/495; 55/422; 55/493; 55/DIG. 30; 210/497.01; 210/497.1; 210/167.12; 95/273; 95/285; 95/286; 95/287

(58) Field of Classification Search .................. 55/498, 55/483, 510, 302, 385.3, 502, 497, 506, 505, 55/521, 495, 422, 49, 3, DIG. 30; 210/497.01, 210/497.1, 167.12; 95/273, 285–287; 156/304.3
See application file for complete search history.

(56) References Cited

U.S. PATENT DOCUMENTS

| | | | |
|---|---|---|---|
| 3,488,928 A * | 1/1970 | Tarala | 96/421 |
| 4,395,269 A | 7/1983 | Schuler | |
| 6,364,921 B1 | 4/2002 | Raether et al. | |
| 6,488,746 B1 | 12/2002 | Kosmider et al. | |
| 2004/0112020 A1 | 6/2004 | Wilson | |
| 2004/0261376 A1 | 12/2004 | Morgan et al. | |
| 2005/0284116 A1 | 12/2005 | Duffy | |
| 2006/0138038 A1 | 6/2006 | Proulx et al. | |

OTHER PUBLICATIONS

Brochure for FARR Air Pollution Control—HemiPleat Filter Technology. Date unknown.
PCT international search report and written opinion of PCT/US 10/26223 dated Apr. 23, 2010.

* cited by examiner

*Primary Examiner* — Jason M Greene
*Assistant Examiner* — Dung H Bui
(74) *Attorney, Agent, or Firm* — Patterson & Sheridan, LLP

(57) ABSTRACT

Embodiments for a filter and method for fabricating the same are provide herein. In one embodiment, a filter is provided that includes a first end cap, a second end cap, at least a first filtration media element and at least a first brace. The first end cap has an air flow aperture formed therethrough. The first and second end caps define a central axis. The first filtration media element is coupled to the first and second end caps and has an orientation curved around the central axis. The brace separates a first closed edge of the filtration media element from a second closed edge of the filtration media element.

20 Claims, 8 Drawing Sheets

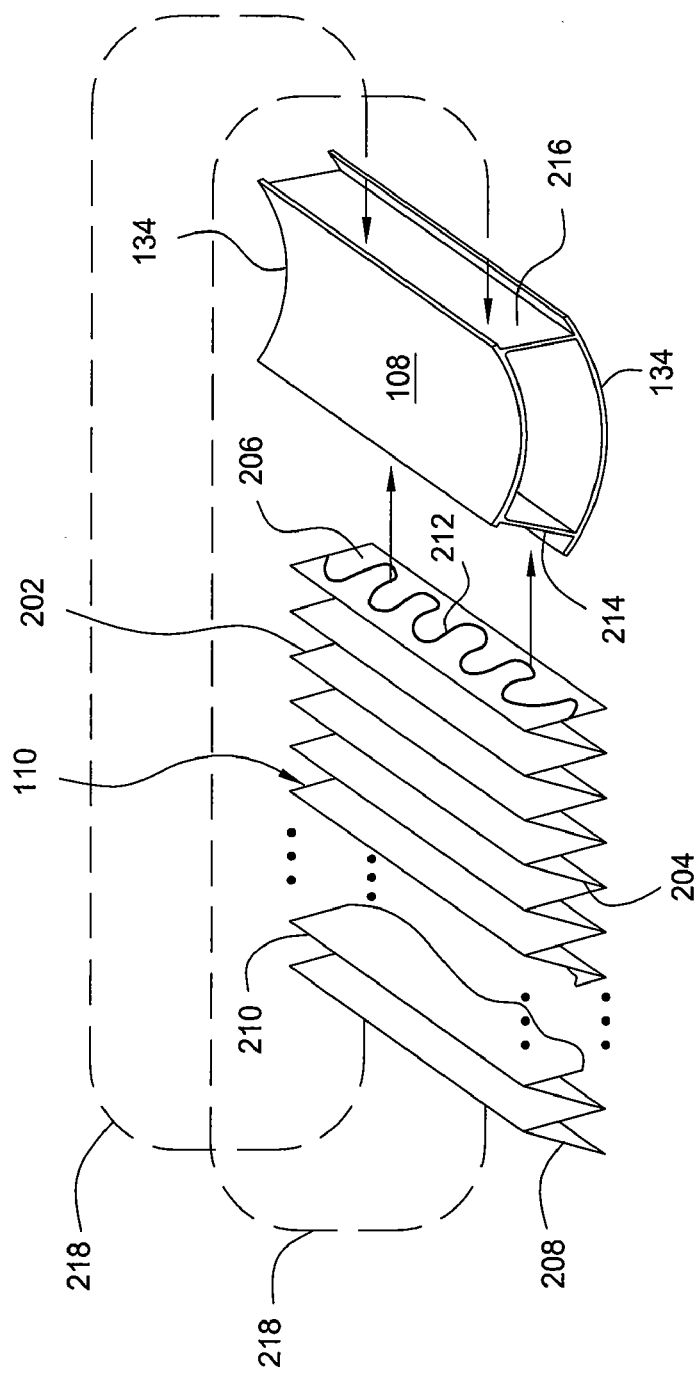
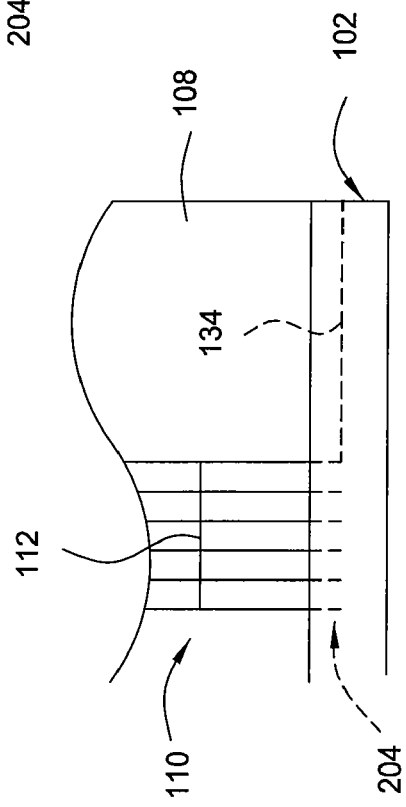
FIG. 2
FIG. 3

US 8,197,570 B2

CANISTER AIR FILTER AND METHOD FOR FABRICATING THE SAME

BACKGROUND OF THE INVENTION

1. Field of the Invention

The embodiments of the invention generally relate to a canister air filter and methods for fabricating the same.

2. Description of the Related Art

Canister air filters may be employed for a variety of uses, including industrial dust collectors. In many dust collectors, the canister air filter is mounted in a substantially horizontal orientation to facilitate the removal and replacement of the filters once the operational life of the filters has been exceeded. In a horizontal orientation, i.e., a filter orientation wherein the center line of the canister air filter is substantially horizontal, the filtration media exposed at the top of the filter rapidly becomes coated with dust cake due to gravity and air flow patterns within the dust collector. The dust cake prevents air from passing through the filtration media. Thus, the top portion of the canister filter typically provides little or no air filtration in comparison to the remainder of the filter during substantial periods of normal operation. Some industrial dust collectors utilize a reverse pulse of air to remove the dusk cake, but the relatively heavier dust cake present at the top relative to the sides/bottom of the canister filter may not be completely removed during the reverse pulse, leaving the top portion of the canister filter in a partially blocked state reducing the performance of the filter. Since the filtration media is one of the most expensive components of the canister filter, the presence of partially blocked filtration media at the top of the canister air filter adversely affects to the balance between material costs to filter performance.

Therefore, there is a need for an improved canister air filter.

SUMMARY OF THE INVENTION

Embodiments for a filter and method for fabricating the same are provided herein. In one embodiment, a filter is provided that includes a first end cap, a second end cap, at least a first filtration media element and at least a first brace. The first end cap has an air flow aperture formed therethrough. The first and second end caps define a central axis. The first filtration media element is coupled to the first and second end caps and has an orientation curved around the central axis. The brace separates a first edge of the filtration media element from a second edge of the filtration media element.

In another embodiment, a filter is provided that includes a first end cap, a second end cap, a first filtration media element, a second filtration media element, a first brace and a second brace. The first end cap has an air flow aperture formed therethrough and faces the second end cap. The first and second filtration media elements have open edges sealingly engaged with the first and second end caps. The first filtration media element and the second filtration media element define at least a portion of a tubular filtration media assembly. The first brace and the second brace are coupled to the first and second end caps. The first brace separates a first closed edge of the first filtration media element from a first closed edge of the second filtration media element. The second brace is sealed to a second closed edge of the first filtration media element.

In yet another embodiment, a method for fabricating a filter is provided. In one embodiment, the method includes non-concentrically and non-axially arranging open edges of at least a first filtration media element and a second filtration media element to form a tubular sleeve of filtration media, adjacent closed edges the two filtration media elements separated by a brace, and sealing the open edges of the first filtration media element and the second filtration media element to form a canister filter.

BRIEF DESCRIPTION OF THE DRAWINGS

The accompanying drawings, which are incorporated in and constitute a part of the specification, schematically illustrate the present invention, and together with the general description given above and the detailed description given below serve to explain the principles of the invention.

FIG. 2 is an isometric view of one embodiment of a filtration media and a brace prior to forming a tubular filtration media assembly;

FIG. 3 is a partial elevation of the canister air filter of FIG. 1;

To facilitate understanding, identical reference numerals have been used, where possible, to designate identical elements that are common to the figures. It is contemplated that elements of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
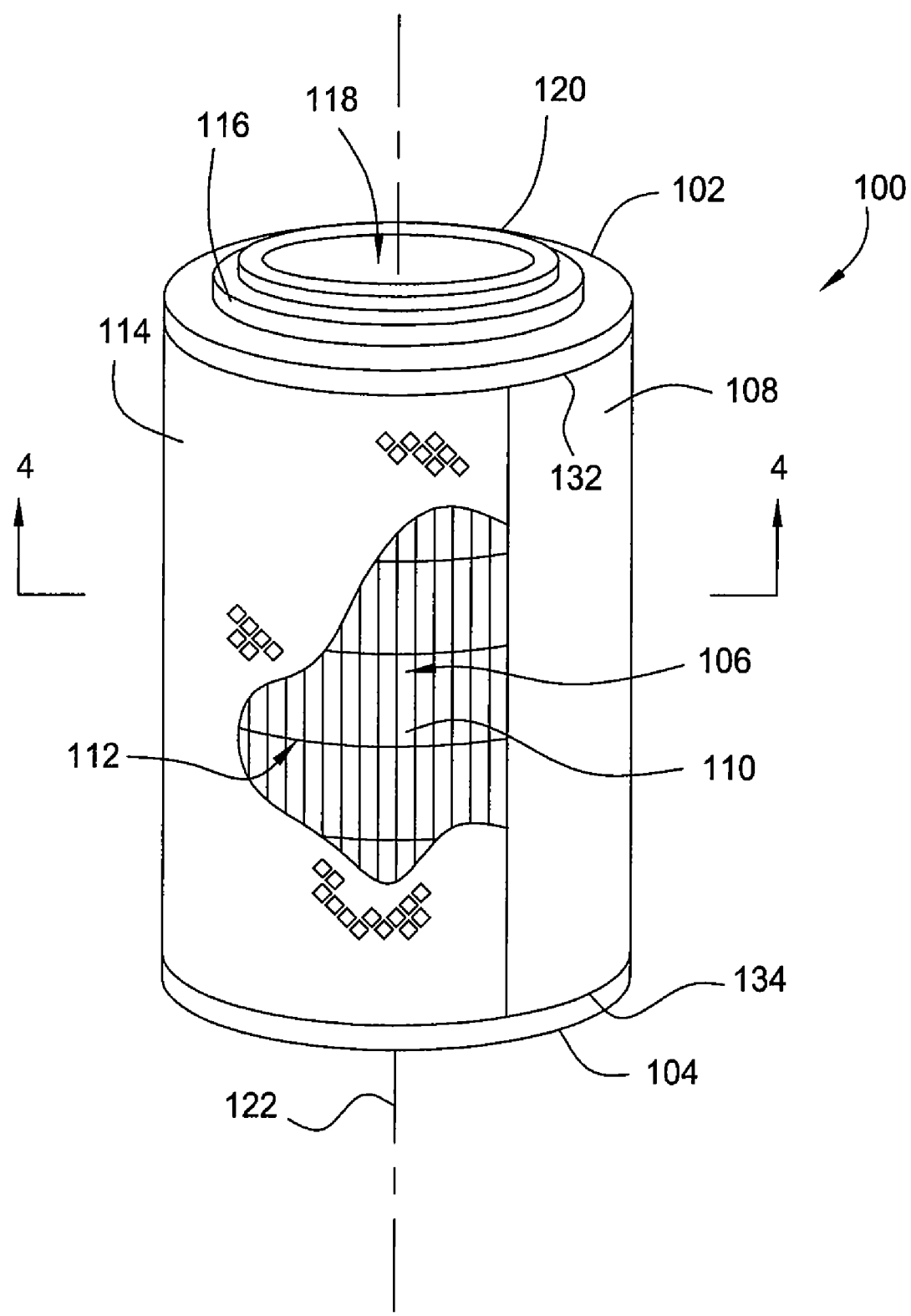
FIG. 1 is an isometric view of one embodiment of a canister air filter.

FIGS. 1-2 are isometric and sectional views of one embodiment of a canister filter 100. Referring to both FIGS. 1-2, the canister filter 100 generally has a tubular orientation centered on a central axis 122. In one embodiment, the canister filter 100 includes a first end cap 102, a second end cap 104, at least a first media element 106 and at least a first brace 108. An optional outer screen 114 may cover the first media element 110, and is shown cut away in FIG. 1, to reveal the first media element 110. The first and second end caps 102, 104 generally define the distal ends of the canister filter 100 and generally have an orientation substantially perpendicular to the center line 122. It is also contemplated that the first and second end caps 102, 104 may alternatively have an orientation non-perpendicular to the center line 122.

Generally, the number of media elements equals the number of braces. For example, the canister filter 100 may include N media elements and N braces, wherein N is an integer greater than or equal to 1. The N media elements and N braces form tubular filtration media assembly 124. The distal ends of the N media elements and N braces are sealed to the end caps 102, 104. In the embodiment depicted in FIGS. 1-6, the first media element 106 and the first brace 108 form the tubular filtration media assembly 124.

Figure 4:
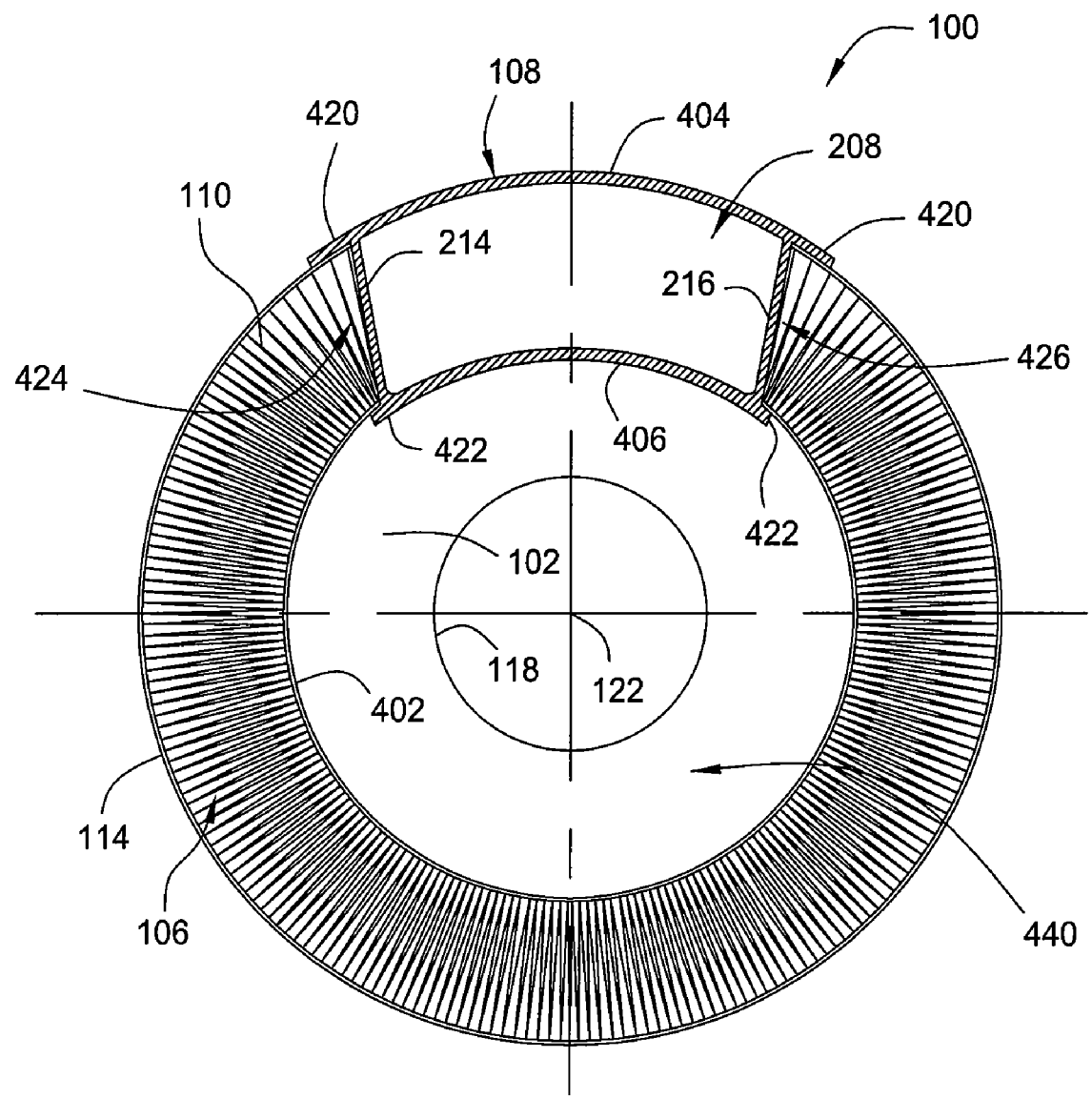
FIG. 4 is a sectional view of the air filter of FIG. 1 taken along section line 2-2.
Figure 5:
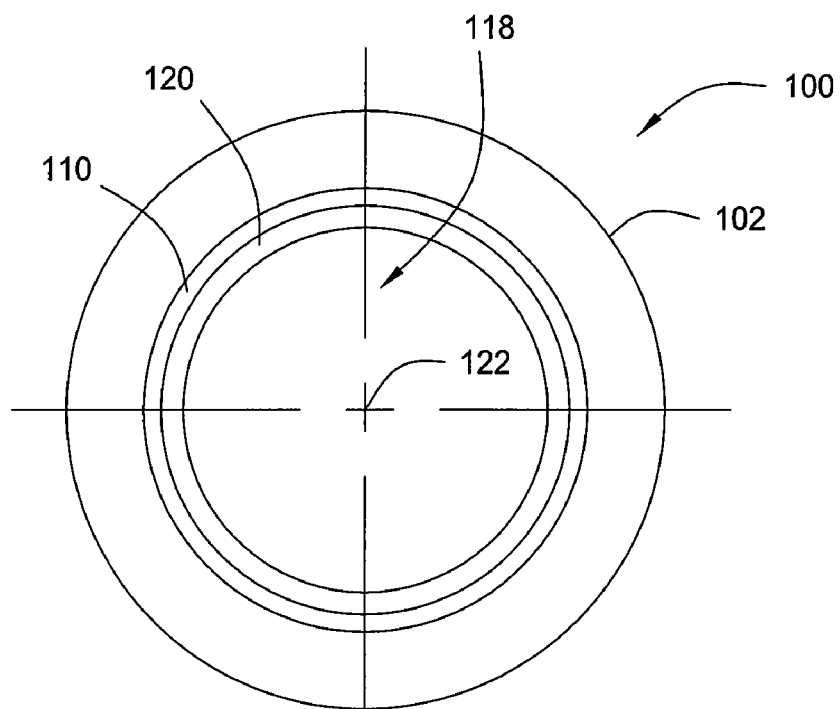
FIG. 5 is a top view of the canister air filter of FIG. 1.
Figure 6:
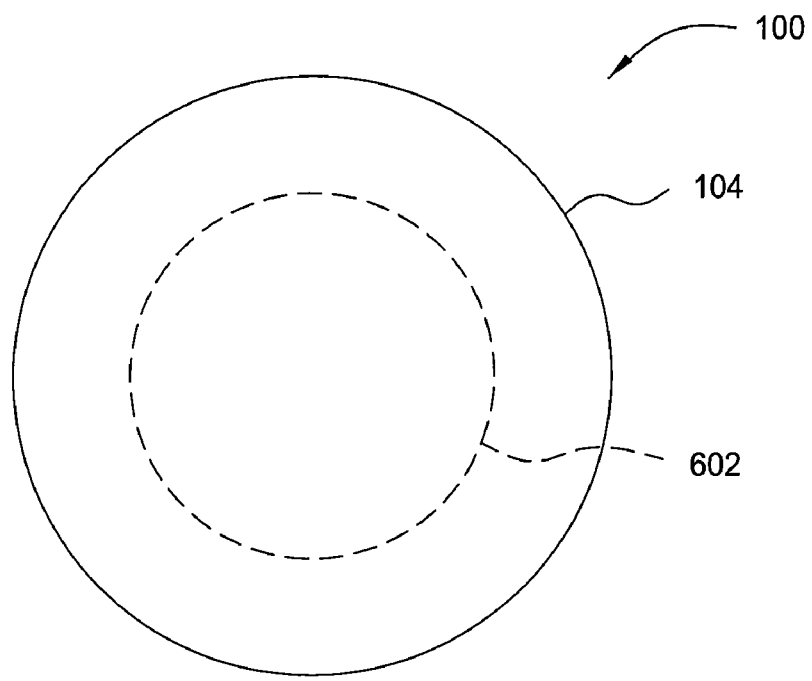
FIG. 6 is a bottom view of the canister air filter of FIG. 1.

The profile of the tubular filtration media assembly 124 is illustrated with greater clarity in the sectional view of the canister filter 100 depicted in FIG. 4. Although the tubular filtration media assembly 124 is illustrated in FIG. 4 as a circle having internal volume, the tubular filtration media assembly 124 may be configured to have other sectional profiles, such as oval, elliptical, polygonal or other tubular shape.

Referring back to both FIG. 1 and FIG. 2, the first filter element 106 includes filtration media 110. The filtration media 110 may be in the form of particulate or molecular phase filtration media. In one embodiment, suitable filtration media includes carbon containing filtration media, carbon-based filtration media, carbon filtration media, high loft filtration media, cellulous filtration media, wet laid filter media, glass filtration media, polymeric filtration media or other suitable filtration media. In one embodiment, the filtration media 110 may be pleated to increase the effective surface area of the first media element 106. The pleats of the filtration media 110 may be secured in a pre-defined orientation by a separator 112. The separator 112 may be in the form of a continuous or discontinuous adhesive or hot melt, a string separator, a rigid separator or other pleat spacing element.

When pleated, the first media element 106 includes open edges 202, 204 and closed edges 206, 208. The open edges 202, 204 of the filtration media 110 define the edges of the filtration media 110 perpendicular to folds 210 of the pleats while the closed edges 206, 208 of the filtration media 110 define the edges of the filtration media 110 parallel to the folds 210 of the pleats. To fabricate the tubular filtration media assembly 124 (not shown assembled in FIG. 2), an adhesive 212 is utilized to secure the first closed edge 206 of the filtration media 110 to a first lateral side 214 of the first brace 108. The second closed edge 208 of the filtration media 110 is doubled back and secured, for example, by additional adhesive 212, to a second lateral side 216 of the first brace 108 to form the tubular filtration media assembly 124, as shown along phantom arrows 218.

In embodiments wherein N media elements and N braces are used form the tubular filtration media assembly 124, the first closed edge of the $N^{th}$ media element is secured to the first side of the $N^{th}$ brace. The first closed edge of the $N^{th}-1$ media element is secured to the second side of the $N^{th}$ brace. The second closed edge of the $N^{th}-1$ media element is secured to the first side of the $N^{th}-1$ brace. The $N^{th}-1$ brace is secured to the second closed edge of the $N^{th}$ media element, or to one or more additional brace and media element pairs into the tubular assembly is formed 124.

The adhesive 212 or alternative technique utilized to secure the closed edges 206, 208 of the filtration media 110 to the first brace 108 is selected to substantially prevent air leakage. Generally, the sealing adhesive 212 and/or technique may be selected commensurate with the level of leakage permissible for the application for which the canister filter 100 is intended for use. In one embodiment, the adhesive 212 and/or sealing technique provides a substantially air tight seal at pressure drops across the media element 106 up to at least about 6 inches water gage. In the embodiment depicted in FIG. 2, the adhesive 212 utilized to secure the closed edges 206, 208 of the filtration media 110 to the first brace 108 may include tape, pressure sensitive adhesives, polyurethane adhesives, epoxy, latex adhesives, hot melt or other suitable adhesive compound.

The open edges 202, 204 of the filtration media 110 and opposite ends 132, 134 of the first brace 108 are sealed to the end caps 102, 104. The open edges 202, 204 and ends 132, 134 may be sealed by any suitable manner. In the embodiment depicted in the partial elevation of FIG. 3 having the outer screen 114 removed, the first open edge 202 of the filtration media 110 and the end 132 of the first brace 108 are potted in, molded or otherwise adhered to the end cap 102, as shown in phantom, thereby substantially preventing air leakage around the open edge 204 of the folds 210 of the pleats. In one embodiment, the first end cap 102 is casted from polyurethane, ceramic or other suitable polymer. Alternatively, the first end cap 102 may be in the form of an annular disk for retaining a compound in with the first open edge 202 of the filtration media 110 and the end 132 of the first brace 108 may be engaged and sealed. The second open edge 204 of the filtration media 110 and the second end 134 of the first brace 108 are similarly sealed to the second end cap 104.

The first brace 108 provides one or more functions. The canister filter 100 may be installed in an orientation having the first brace 108 exposed on the top of the filter, thereby preventing vertically falling particulates from clogging upward facing filtration media of the canister filter 100. Additionally, as the first brace 108 is a structural member spanning between the end caps 102, 104, the first brace 108 allows greater compression forces to be exerted on the canister filter 100 without fear of collapse, thereby allowing higher and generally more effective sealing forces to be utilized to secure the canister filter 100 in a dust collector or other filter holding device.

Referring now back to FIG. 1 and the sectional view of FIG. 4, the first brace 108 may be fabricated from a substantially rigid material, such as aluminum, plastic, wood or paper product or other suitable material. In one embodiment, the first brace 108 is an extrusion. The first brace 108 may include a hollow to increase rigidity while decreasing cost. It is also contemplated that the first brace 108 may be stamped or vacuum formed.

The first brace 108 includes an outer surface 404 and an inner surface 406 that are sandwiched between the lateral sides 214, 216. The outer surface 404 may have a radius having an origin on the central axis 122. The inner surface 406 may also have a radius having an origin on the central axis 122. The inner surface 406 may optionally have a radius having an origin defined between the central axis 122 and the inner surface 406. The inner surface 406 may optionally have a radius greater than that of the outer surface 404.

The first brace 108 includes outer lips 420 adjacent the outer surface 404 and inner lips 422 adjacent the inner surface 406. The lips 420, 422 extend beyond the lateral sides 214, 216 to define respective troughs 424, 426. The troughs 424, 426 receive the closed edges 206, 208 of the filtration media 110. The outer lips 420 also secure the ends of the outer screen 114 in the troughs 424, 426 while the inner lips 422 secure ends of an optional inner screen 402 in the troughs 424, 426.

The outer screen 114 protects the filtration media 110 from damage and may be fabricated from a metal, plastic or other suitable material. The outer screen 114 may be an expanded material, a perforated sheet, a mesh, a web or other suitable air permeable material. The optional inner screen 402 may be similarly constructed. The screens 114, 402 may be potted in the end caps 102, 104 with the filtration media 110 and the first brace 108.

At least one of the end caps 102, 104 has an aperture that allows air to enter into or flow out of an interior 440 of the canister filter 100, depending on the direction of air flow though the first media element 106. In the embodiment depicted in FIG. 1, and as more clearly illustrated in the plan view of FIG. 5, the first end cap 102 includes an aperture 118 formed therethrough. The aperture 118 may be circumscribed by a boss 120, thereby allowing the canister filter 100 to be more precisely positioned in a mating receiving element. The boss 120 also allows location of a seal 116 on the first end cap 102. The seal 116 may be a gasket, o-ring, pour-in-place elastomer or other suitable sealing member. In one embodiment, the seal 116 is an elastomer secured to the first end cap 102 by a pressure sensitive adhesive.

The second end cap 104 may be solid or include an optional an aperture that allows air to enter into or flow out of the interior volume 440 of the canister filter 100. In the embodiment depicted in the bottom view of the canister filter 100 of FIG. 6, the optional aperture 602 is shown in phantom.

In one mode of operation, air to be filtered is provided to the outside of the canister filter 100. Air passes through the filtration media 110 and into the interior volume 240. The filtered air in the interior volume 240 exits the canister filter 100 through the aperture 118 formed in the end cap 102. In another mode of operation, the air to be filtered is provided to the interior volume 240 of the canister filter 100 through the aperture 118 formed in the end cap 102. The air is filtered as the air passes through the filtration media 110 to the exterior of the canister filter 100.

Figure 7:
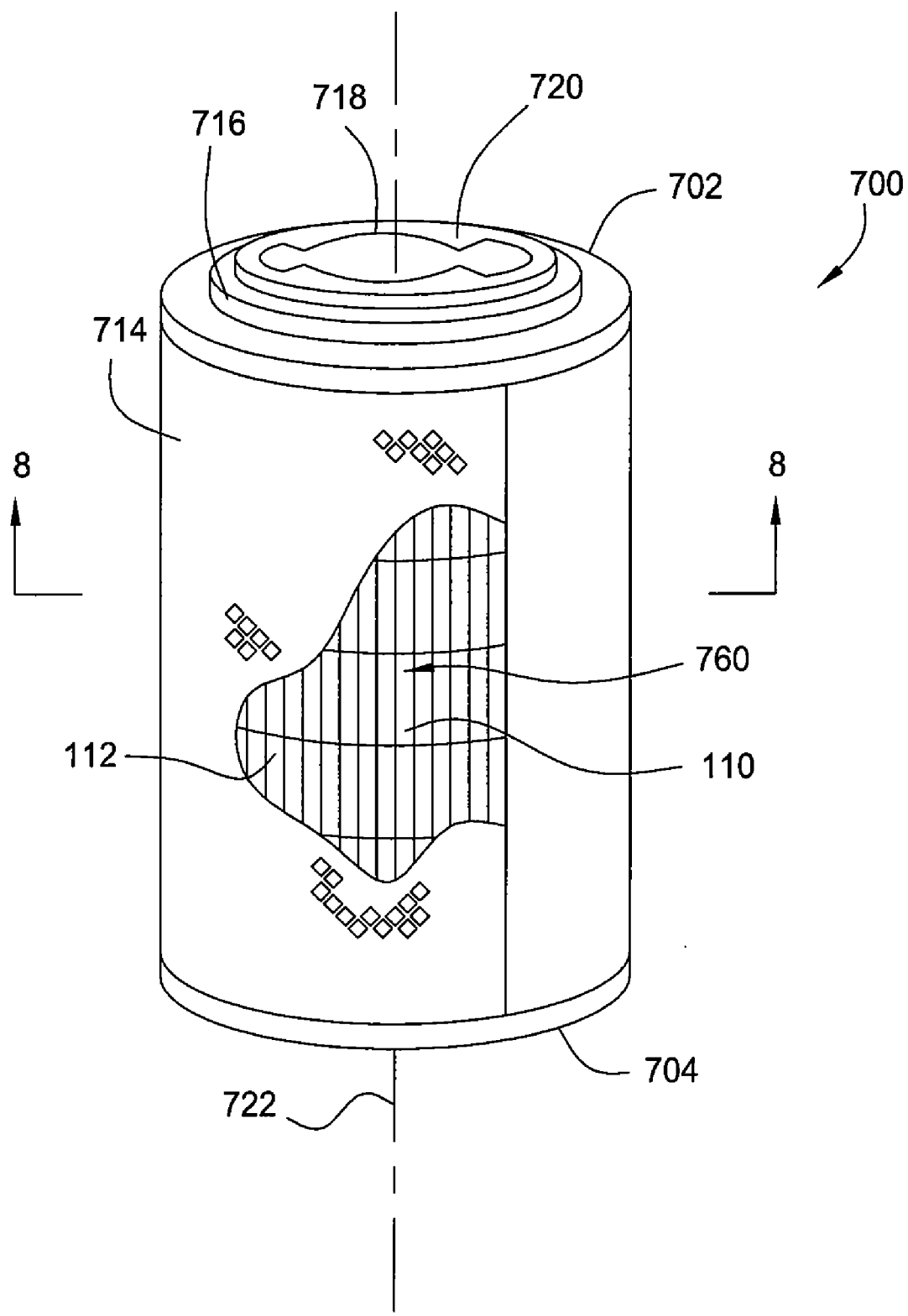
FIG. 7 is a isometric view of another embodiment of a canister air filter.
Figure 8:
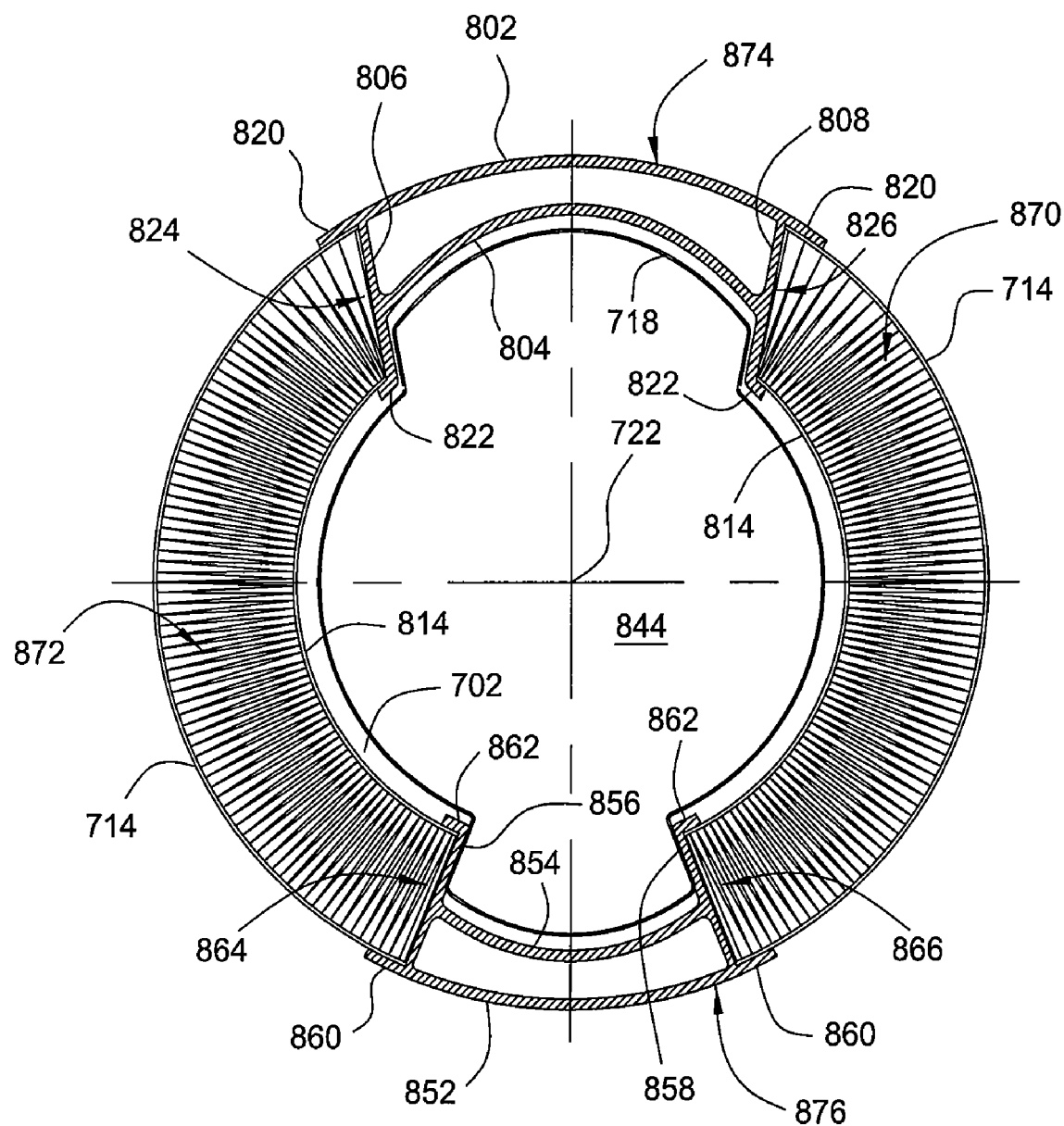
FIG. 8 is a cross-sectional view of the canister air filter of FIG. 7 taken along section lines 8-8.

FIGS. 7-8 are isometric and sectional views of one embodiment of a canister filter 700. Referring to both FIGS. 7-8, the filter 700 is generally similar to the canister filter 100 described above, centered on a central axis 722. In one embodiment, the filter 700 includes a first end cap 702, a second end cap 704 and a tubular media assembly 760. The tubular media assembly 760 includes a plurality of media elements and a plurality of braces which are coupled together to form a tube as discussed above. In the embodiment depicted in FIGS. 7-8, the tubular media assembly 760 includes a first media element 870 and a second media element 872 interleaved with a first brace 874 and a second brace 876. It is contemplated that the tubular media assembly 760 may include more than two media elements and braces, for example, the tubular media assembly 760 may include the N media elements and N braces, wherein N is an integer greater than or equal to 3. The tubular media assembly 760 may have a circular or non-circular section as discussed above.

The canister filter 700 may also include optional outer and inner screens 714, 814. The outer and inner screens 714, 814 may be fabricated from an expanded material, a perforated sheet, a mesh, a web or other suitable air permeable material. The screens 714, 814 may be potted in the end caps 702, 704 with the tubular media assembly 760 as described above.

Referring primarily to the sectional view of FIG. 8, the first brace 874 may be fabricated from a substantially rigid material, such as aluminum, plastic, wood or paper product or other suitable material. The first brace 874 may be extruded, stamped, vacuum formed or fabricated by another suitable method. The first brace 874 may include a hollow to increase strength and decrease cost.

In one embodiment, the first brace 874 includes an outer surface 802, an inner surface 804, a first lateral side 806 and a second lateral side 808. The outer surface 802 of the first brace 874 may have a radius having an origin on the central axis 722. The inner surface 804 may also have a radius having an origin on the central axis 722. The inner surface 804 may optionally have a radius less, equal to or greater than a radius of the outer surface 802. In the embodiment depicted in FIG. 8, the radius of the inner surface 804 has an origin between the center axis 722 and the inner surface 804.

In one embodiment, the first brace 874 may include outer lips 820 adjacent the outer surface 802 and inner lips 822 adjacent the inner surface 804. The lips 820, 822 extend beyond the lateral sides 806, 808 to define respective troughs 824, 826. The troughs 824, 826 receive the closed edges of the adjacent filtration media utilized to form the tubular media assembly 760. The closed edges of the filtration media may be sealed to the first brace 874 as described above. The outer lips 820 also secure ends of the outer screen 714 in the troughs 824, 826 while the inner lips 822 secure ends of the optional inner screen 814 in the troughs 824, 826.

The second brace 876 is separated from the first brace 874 by the first media element 870 and the second media element 872. In one embodiment, the first media element 870 and the second media element 872 are substantially equal in length, such that the second brace 876 positioned 180 degrees from the first brace 874. Alternatively, the second brace 876 may be positioned closer to one side of the first brace 874.

The second brace 876 may be fabricated as described above with reference to the first brace 874. The sectional profile of the second brace 876 may be identical to or different than the first brace 874. In one embodiment, the second brace 876 has a smaller sectional profile than the first brace 874 as to minimized the area taken by the braces, thereby allowing for more of the circumference of the canister filter 700 to be utilized for filtration media. In the embodiment depicted in FIG. 8, the second brace 876 is a smaller mirror image of the first brace 874. The use of multiple braces allows for increase filter rigidity and increased options for mounting the canister filter 700 to dust collection mechanisms or other filter holding device.

In one embodiment, the second brace 876 includes an outer surface 852, an inner surface 854, a first lateral side 856 and a second lateral side 858. The outer surface 852 of the second brace 876 may have a radius having an origin on the central axis 722, and in one embodiment, has a radius equal to that of the outer surface 802 of the first brace 874. The inner surface 854 may also have a radius having an origin on the central axis 722. The inner surface 854 may optionally have a radius less, equal to or greater than a radius of the outer surface 852. In the embodiment depicted in FIG. 8, the radius of the inner surface 854 has an origin between the center axis 722 and the inner surface 854, and has a radius greater than that of the inner surface 804 of the first brace 874.

In one embodiment, the second brace 876 may include outer lips 860 adjacent the outer surface 852 and inner lips 862 adjacent the inner surface 854. The lips 860, 862 extend beyond the lateral sides 856, 858 to define respective troughs 864, 866. The troughs 864, 866 receive the closed edges of the adjacent filtration media utilized to form the tubular media assembly 760. The closed edges of the filtration media may be sealed to the second brace 876 as described above. The outer lips 860 also secure ends of the outer screen 714 in the troughs 864, 866 while the inner lips 862 secure ends of the optional inner screen 814 in the troughs 864, 866.

At least one of the end caps 702, 704 has an aperture that allows air to enter into or flow out of an interior volume 844 of the canister filter 700, depending on the direction of flow though the tubular media assembly 706. In the embodiment depicted in FIG. 7, and as more clearly illustrated in the plan view of FIG. 9, the first end cap 702 includes an aperture 718 formed therethrough. The aperture 718 may be circumscribed by a boss 720, thereby allowing the canister filter 700 to be more precisely positioned in a mating receiving element. The boss 720 also allows location of a seal 716 on the first end cap 702. The seal 716 may be a gasket, o-ring, pour-in-place elastomer or other suitable sealing member. In one embodiment, the seal 716 is an elastomer secured to the first end cap 702 by a pressure sensitive adhesive.

Figure 9:
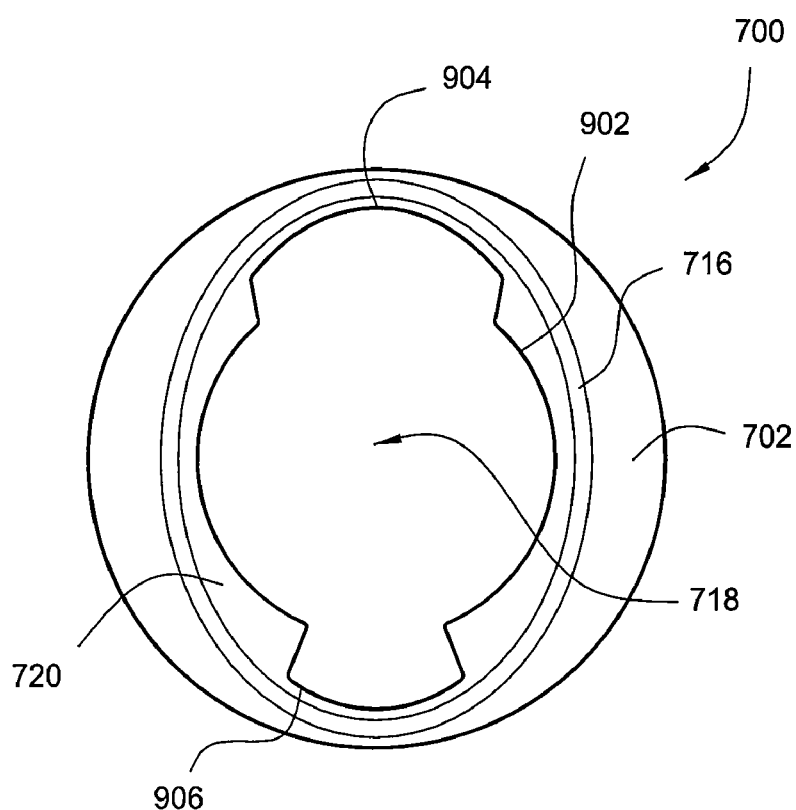
FIG. 9 is a top view of the canister air filter of FIG. 7.

The aperture 718 may have a circular or other shape. In the embodiment of FIG. 9, the aperture 718 includes a central circular portion 902 and two truncated wedge portions 904, 906 that forms a butterfly shape. The wedge 904 may be larger than the wedge 906.

Figure 10:
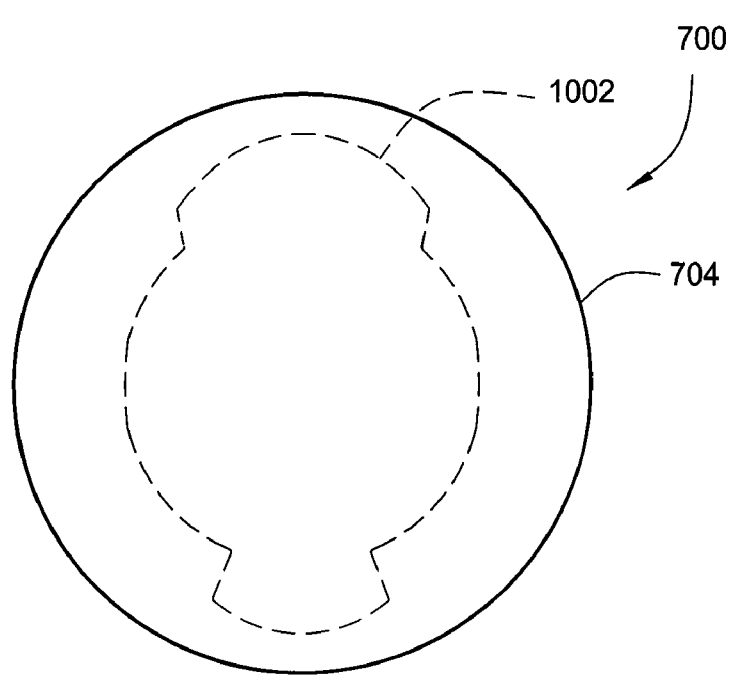
FIG. 10 is a bottom view of the canister air filter of FIG. 7.

The second end cap 704 may be solid or include an optional an aperture that allows air to enter flow into or out of an interior 840 of the canister filter 700. In the embodiment depicted in the bottom view of the canister filter 700 of FIG. 10, the optional aperture 1002 is shown in phantom.

Figure 11:
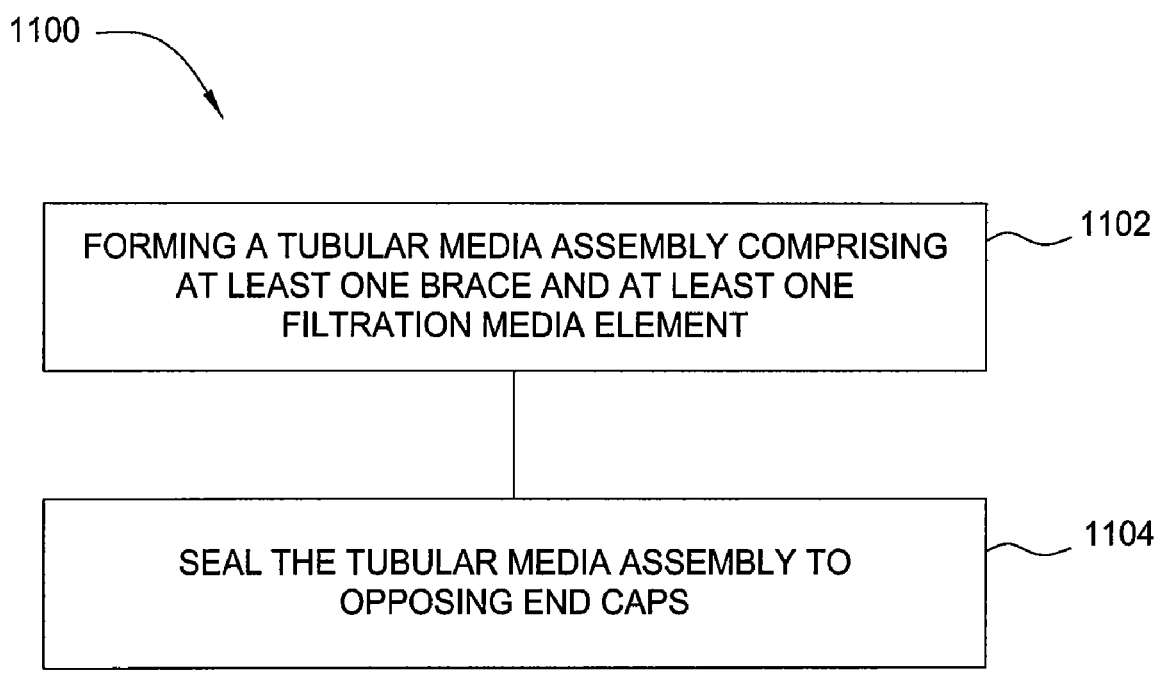
FIG. 11 is a flow diagram for one embodiment of a method for fabricating a canister air filter.

FIG. 11 is a flow diagram of one embodiment of a method 1100 for fabricating a canister filter. The method 1100 begins at step 1102 by forming a tubular media assembly comprising at least one brace and at least one filtration media element. The at least one brace and at least one filtration media element are arranged to form a sleeve, i.e., arranged in a non-axial and non-concentric orientation. The tubular media assembly is formed by sealingly coupling the filtration media element (s) to the brace(s). The tubular media assembly may optionally include an inner and/or outer screen. At step 1104, the tubular media assembly is sealed to opposing end caps. In one embodiment wherein the tubular media assembly includes pleated filter media, the open edges of the pleated filter media and the ends of the brace(s) are potted in or otherwise sealed to opposing end caps.

While the foregoing is directed to embodiments of the present invention, other and further embodiments of the invention may be devised without departing from the basic scope thereof, and the scope thereof is determined by the claims that follow.

What is claimed is:

1. A filter comprising:
   a first end cap having an air flow aperture formed therethrough;
   a second end cap facing the first end cap, the first end cap and the second end cap defining a central axis;
   at least a first filtration media element having a first open edge sealingly engaged with the first end cap and a second open edge sealingly engaged with the second end cap, the first filtration media element having an orientation curved relative to the central axis; and
   at least a first brace coupled to the first end cap and the second end cap, the first brace separating a first closed edge of the first filtration media element from a second closed edge of the first filtration media element.

2. The filter of claim 1, wherein the first filtration media element is pleated.

3. The filter of claim 1, wherein the first filtration media element is a molecular phase filtration media.

4. The filter of claim 3, wherein the molecular phase filtration media further comprise carbon-based media.

5. The filter of claim 1, wherein the first brace further comprises:
   an extruded or stamped member.

6. The filter of claim 1, wherein the first brace further comprises:
   a hollow interior.

7. The filter of claim 1, wherein the first brace further comprises:
   an interior wall facing the central axis;
   an exterior wall facing away from the interior wall; and
   side walls extending between the interior wall and the exterior wall, wherein the first closed edge of the first filtration media element is sealed to one of the side walls.

8. The filter of claim 7, wherein the exterior wall has a radius having an origin at the central axis.

9. The filter of claim 1, wherein the first closed edge of the first filtration media element is sealed to the first brace.

10. The filter of claim 1 further comprising:
    a second brace coupled to the first end cap and the second end cap, wherein the first closed edge of the first filtration media element is sealed to the first brace and the second closed edge of the first filtration media element is sealed to the second brace.

11. A filter comprising:
    a first end cap having an air flow aperture formed therethrough;
    a second end cap facing the first end cap;
    a first filtration media element having open edges sealingly engaged with the first end cap and the second end cap;
    a second filtration media element having open edges sealingly engaged with the first end cap and the second end cap, the first filtration media element and the second filtration media element defining at least a portion of a tubular filtration media assembly;
    a first brace coupled to the first end cap and the second end cap, the first brace separating a first closed edge of the first filtration media element from a first closed edge of the second filtration media element; and
    a second brace coupled to the first and second end caps, the second brace sealed to a second closed edge of the first filtration media element.

12. The filter of claim 11, wherein the first filtration media element and the second filtration media element are pleated.

13. The filter of claim 11, wherein the first filtration media element and the second filtration media element comprises molecular phase filtration media.

14. The filter of claim 11, wherein the first brace further comprises:
    an extruded or stamped member.

15. The filter of claim 11 further comprising:
    an inner screen disposed inward of the first filtration media and the second filtration media element.

16. The filter of claim 11, wherein the tubular filtration media assembly is at least one of an oval, cylinder or polygon.

17. The filter of claim 11, wherein the first closed edge of the first filtration media is sealed to the first brace.

18. The filter of claim 11, wherein the first brace is sealed to the first closed edge of the first filtration media element and to the first closed edge of the second filtration media element; and
    wherein the second brace is sealed to a second closed edge of the second filtration media element.

19. A method for fabricating an air filter, the method comprising:
    non-concentrically and non-axially arranging open edges of at least a first filtration media element and a second filtration media element to form a tubular sleeve of filtration media, adjacent closed edges the first filtration media element and the second filtration media element separated by a brace;
    sealing adjacent closed edges of the first and second filtration media elements to the brace; and
    sealing the open edges of the first filtration media element and the second filtration media element to form a canister filter.

20. A method for fabricating an air filter, the method comprising:
    non-concentrically and non-axially arranging open edges of at least a first filtration media element to form a tubular sleeve of filtration media, adjacent closed edges of the first filtration media element separated by a brace;
    sealing adjacent closed edges of the first filtration media element to the brace; and
    sealing the open edges of the first filtration media element to form a canister filter.

* * * * *